United States Patent [19]
Zimmerman

[11] 3,880,048
[45] Apr. 29, 1975

[54] APPARATUS FOR CUTTING IRREGULAR EDGE CONTOURS IN RELATIVELY FLAT WORKPIECES

[76] Inventor: Sanford S. Zimmerman, 46 Easton Rd., Westport, Conn. 06880

[22] Filed: Apr. 7, 1972

[21] Appl. No.: 241,950

[52] U.S. Cl. .................. 90/13.4; 83/410; 83/413; 144/145 A
[51] Int. Cl. .............................. B23c 1/18
[58] Field of Search .................. 90/13.2, 13.3, 13.4; 144/134 A, 145 A; 83/410, 565, 745, 413; 279/3; 269/21

[56] References Cited
UNITED STATES PATENTS

| | | | |
|---|---|---|---|
| 1,300,815 | 4/1919 | Cameron | 144/145 A |
| 1,337,695 | 4/1920 | Emery | 144/145 A |
| 1,426,932 | 8/1922 | Wallace | 83/410 |
| 1,836,036 | 12/1931 | Morris | 144/145 A |
| 2,107,578 | 2/1938 | Onsrud | 144/145 A |
| 2,142,863 | 1/1939 | Whitney | 144/145 A |
| 2,323,587 | 7/1943 | Duffy | 144/144 |
| 2,722,957 | 11/1955 | Marvosh | 144/134 A |
| 3,052,479 | 9/1962 | La Trell | 279/3 |
| 3,473,580 | 10/1969 | Dunn et al. | 83/410 |

FOREIGN PATENTS OR APPLICATIONS

| | | | |
|---|---|---|---|
| 121,296 | 8/1900 | Germany | 83/410 |

*Primary Examiner*—Andrew R. Juhasz
*Assistant Examiner*—Z. B. Bilinsky
*Attorney, Agent, or Firm*—Martin D. Wittstein

[57] ABSTRACT

A machine is disclosed for edge cutting relatively flat sheet material into pieces having any desired irregular configuration. An overhead radial arm supports a cutting tool in a fixed position in space and a lower work holding support is mounted for movement in a horizontal plane in a direction toward and away from the tool and for rotation about its axis, and holds the work preferably as by a vacuum applied to the underside of the work. By manipulating the work holder in simultaneous rotary motion about its own axis and reciprocatory motion toward and away from the tool, the work is moved relative to the cutting tool so as to cause the tool to cut along any non-symetrical or irregular contour as may be desired as well as symetrical shapes, and as controlled by a preformed template held by the work holder.

14 Claims, 10 Drawing Figures

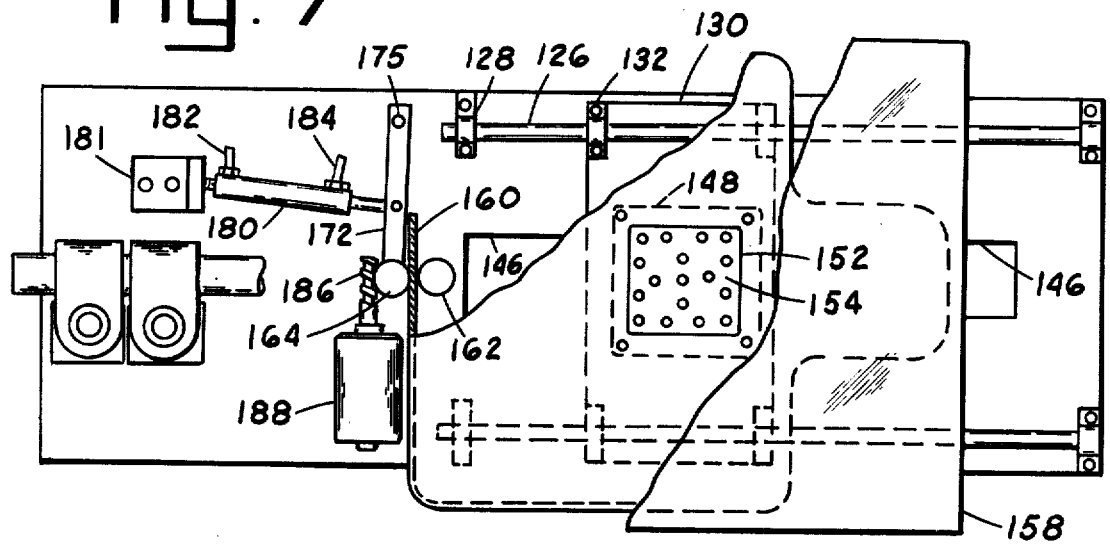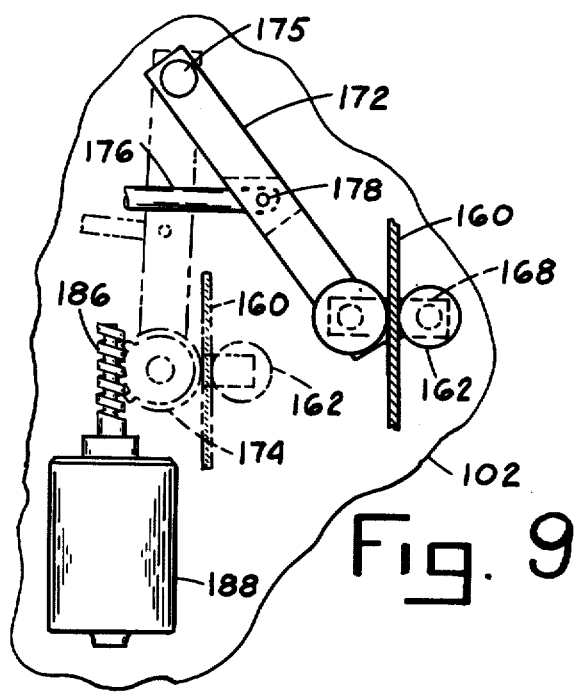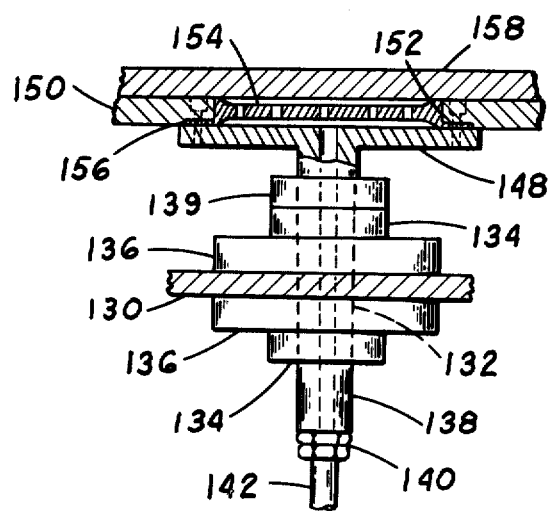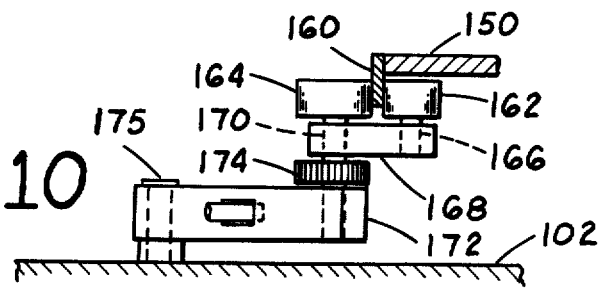

APPARATUS FOR CUTTING IRREGULAR EDGE CONTOURS IN RELATIVELY FLAT WORKPIECES

BACKGROUND OF THE INVENTION

In the field of industrial machine tools, one of the most difficult operations to perform satisfactorily is the cutting of irregularly shaped pieces from flat sheet material. Such pieces can be broadly catagorized as any piece which is devoid of sharp corners, and they range from simple rectangular shapes having rounded corners to totally abstract shapes in which there is no straight edge at all. Additionally, these pieces may be solid across the area thereof, being cut only along an outer edge of the piece, or they may also have an interior portion cut out along an irregular configuration which may or may not be concentric with the exterior configuration, such as a circular or irregularly shaped annulus. Thus it is apparent that the imagination of man is the only limitation on the variety of shapes which it might be desired to impart to a given piece of material.

Machine tools for cutting straight lines have long been well known and have become more or less standarized in principle. Typical examples of such machines are the band saw, in which the work moves linearly relative to the band blade; the table saw, in which the work also moves linearly relative to the saw blade; the radial arm saw, in which the saw blade moves linearly relative to the stationary work; and the panel saw, in which a saw moves in two linear perpendicular directions on a frame relative to a stationary sheet held by the frame. None of these machines, nor the principles upon which they operate, are in any way suitable for cutting irregular, non-linear contours.

In view of the practical inability of standard cutting machines to cut irregular shapes, various industries concerned with cutting irregular shapes in particular materials have devised and developed very specialized machines each uniquely suited to the particular task imposed upon it. These machines are necessarily of limited application, are generally quite complex and therefor expensive, and may become obsolete before their useful life is consumed. An example of one such machine is shown in U.S. Pat. No. 2,774,131 to R. L. Crane, this being an example of a machine for cutting somewhat irregular shapes in thick heavy slabs of material. while this machine could, of course, be scaled down for handling smaller or lighter pieces of material, nevertheless all of the complex work moving structure and the controls therefor would still be required. It should be noted that the machine shown in the above mentioned patent is based on the well known jig saw principle in which work is moved relative to a narrow bank or jig saw blade, a distinct disadvantage of which is that the work must be moved at the point of cut in a direction substantially parallel to the plane of the saw blade, which requires very precise either manual or automatic control over the movement of the work. This is, of course, either time consuming or expensive or both, thereby contributing to higher costs of the ultimate product.

Other techniques heretofore known for cutting irregular shapes in flat sheet material are those which involve a precut pattern or template which defies the configuration desired in the finished piece, the pattern or template being an alternative or substitute for the complex control mechanism shown in the above noted patent. Examples of machines embodying these techniques are shown in U.S. Pat. No. 1,300,815 to D. Cameron; U.S. Pat. No. 2,722,957 to D. Marvosh; U.S. Pat. No. 3,361,032 to E. F. Beezer; and U.S. Pat. No. 3,459,104 to J. T. Parsons, Sr. Each of the machines shown in these patents are particularly designed and/or adapted to cut or shape sheets of flat material into pieces having an irregular configuration according to a similar configuration previously cut or otherwise formed in a template which is suitably mounted on the cutting machine and which controls the path of a cutting tool through the sheet material.

Several significant disadvantages of these machines are apparent from an understanding of these patents, principal among which is that thay are all special purpose machines in original design or are special purpose attachments for standard working machines, in either case having been designed for making a particular product having a particularly shaped contour; therefore, the versatility of these machines is quite limited. They are often extremely complex in construction, as evidenced by the Cameron machine, so that the expense of these machines cannot be justified in terms of their limited applicability. As shown in the Cameron and Marvosh patents, they often include overhead work holding means which both unnecessarily complicates the machines and also prevents rapid and convenient loading of work or prevents the inclusion of automatic work loading apparatus. Still further, as evidenced by the Cameron, Marvosh and Beezer patents, the manner of driving the work holders limits the speed of cutting to that at which the cutter can operate without undesirable chatter at the farthest distance between the cutting tool and the axis of the work holding device, thereby wasting time when the tool to axis distance is less than the maximum, at which lesser distance cutting speed can be faster than at the maximum distance. Finally, although not to the exclusion of other disadvantages, some are designed, as exemplified by the Parsons, Sr. patent, to produce only interior cuts on sheet material which has previously been edge-cut to fit within a template.

Thus, as is presently understood, no machine has been developed for cutting irregularly shaped pieces from sheet material which is based on a sound principle of operation applicable to cutting any shape, exterior or interior, which can handle any size piece of material without modification or major adjustment, which is extremely simple in construction and therefore inexpensive, and which is highly versatile and can achieve high volume production economically.

SUMMARY OF THE INVENTION

The present invention relates generally to machines for cutting sheet material and more particularly to such machines for cutting pieces having irregular contours on external edges thereof.

The present invention is an improvement generally on the type of machines shown in the four patents mentioned above, and is intended to obviate or completely overcome the disadvantages and difficulties encountered in such machines. The cutting machine of the present invention operates on the basic principle of causing relative compound motion between a piece of sheet material to be cut into an irregularly shaped finished piece and a cutting tool, the compound motion consisting of simultaneous rotation of the work about an axis which is both internal to the work piece being cut and is displaced from the axis of the tool and relative lateral displacement or translation between the sheet material and the cutting tool in a direction perpendicular to the axis of rotation of the sheet material. To achieve this latter type of motion, either the cutting tool can be caused to move toward and away from the sheet material which merely rotates but is otherwise fixed in space, or the cutting tool can be maintained fixed in space and the sheet material can be caused to move toward and away from the cutting tool in the plane of the sheet material while simultaneously being rotated so that the axis of rotation of the work also shifts relative to the stationary axis of the tool. In actual practice, as will be more clearly seen hereinafter, the latter procedure is preferable since it can be embodied in a less complex construction than that which is required for the former.

Within the scope of this principle, the present invention is embodied in a novel combination of machine elements and assemblies not heretofore contemplated by the prior art. As more clearly seen hereinafter, this novel combination, in the embodiments disclosed, provides advantages of capability, mode of operation and economy not possible in one machine heretofore. Thus, broadly, a frame supporting a cutting tool and power source in operative juxtaposition with a rotary vacuum work holder, combined with means for causing relative lateral movement between the cutting tool and the work holder, together with a template and means for driving the template at a uniform rate of speed, constitute the essential components of the machine of the present invention. Further details of novelty in the construction, arrangement and functional results obtained thereby will become apparent from the description of preferred embodiments of the invention.

The principles of this invention can, of course, be embodied in several different forms of construction. In the broader aspects of the invention, one such embodiment comprises, in combination, a cutting tool holding device adapted to removably hold a variety of cutting tools, a means for supporting the cutting tool holding device in a fixed predetermined position and a means for driving the cutting tool holding device while it is held in the fixed predetermined position. There is a work holding device for supporting a piece of sheet material to be cut, the work holding device including a guide means for determining the edge configuration of the piece to be cut and a means for movably securing the sheet material to the guide means. There is also provided a means for supporting the work holding device at a lower elevation than the cutting tool holding device such that an edge of a piece of sheet material held by the work holding device is in operative association with a cutting tool held by the cutting tool holding device, and the work holding device supporting means includes a movable means for supporting the work holding device for simultaneous rotation about a central axis of the work holding device perpendicular to the plane of the sheet material held by the work holding device, and for translation relative to the cutting tool holding device in a direction perpendicular to the axis of rotation of the work holding device. Thus, by a combination of rotary and translational movement of the work holding device, the sheet material is cut along an irregular contour as determined by the guide means.

In some of the more limited aspects of the invention, the guiding means is in the form of a pre-cut template or pattern which has cut therein the same final edge contour or configuration as is desired in the finished piece and suitable means are provided to cause the edge of the template to follow a path which keeps it in operative association with the cutting tool.

It is preferred that the means for securing the sheet material to the guide means by a vacuum device built into the work holder or into the guide means in which a vacuum is applied to the surface of the sheet material adjacent to the surface of the guide means, the vacuum being applied from a vacuum source through a rotary joint to facilitate rotation of the work holder while the vacuum is in effect on the sheet material.

Having briefly described the general nature of the present invention and some of the more specific aspects thereof, it is a principal object of the present invention to provide a novel machine for cutting irregular shapes in relatively flat sheet material.

It is another object of the present invention to provide a machine for cutting irregular shapes in relatively flat sheet material which is applicable to a large variety of materials and will cut any size piece from a sheet of larger size.

It is still another object of the present invention to provide a machine for cutting irregular shapes in relatively flat sheet material in which the work being cut is moved in a compound motion relative to a cutting tool so that any desired irregular contour can be cut while the work is moved in a single continuous motion.

It is yet another object of the present invention to provide a machine for cutting irregular shapes in flat sheet material in which the sheet material is secured to a rotary work holder as by a vacuum applied to the surface of the sheet material adjacent the work holder thereby eliminating the need for clamps which would otherwise interfer with a cutting operation.

It is a further object of the present invention to provide a machine for cutting irregular shapes in flat sheet material in which a precut template secured to a work holder securely supports the sheet material and cooperates with the cutting tool such that the cutting tool follows the precut contour of the template and cuts the sheet material to a corresponding shape.

It is another object of the present invention to provide a machine for cutting irregular shapes in relatively flat sheet material in which a driving means for the work holder operates in such a manner that the work holder is driven at a uniform rate of cutting speed rather than at a uniform rate of rotary speed so that the movement of sheet material past the cutting tool can be held at a maximum regardless of the work holder axis to cutting tool distance.

It is a further object of the present invention to provide a machine for cutting irregular shapes in relatively flat sheet material which is relatively simple in construction, is easy to operate and requires a minimum of maintenance.

These and other objects and advantages of the present invention will become more apparent from an understanding of the following detailed description of preferred embodiments of the invention when considered in conjunction with the accompanying drawings in which:

FIG. 7 is a plan view of the machine shown in FIG. 5 with certain parts omited for the sake of clarity and with the work holder shown moved from the work loading position shown in FIG. 5 to a work cutting position;

FIG. 8 is a fragmentary sectional view, drawn to an enlarged scale, of the work holder and supporting means therefore of the machine shown in FIG. 5, and taken on the line 8—8 of FIG. 5;

FIG. 9 is a fragmentary plan view, drawn to an enlarged scale, of the work holder moving mechanism of this embodiment of the invention; and FIG. 10 is a fragmentary view, also drawn to an enlarged scale, of a portion of the work holder moving mechanism shown in FIG. 9.

DETAILED DESCRIPTION OF THE PREFERRED EMBODIMENTS

Figure 1:
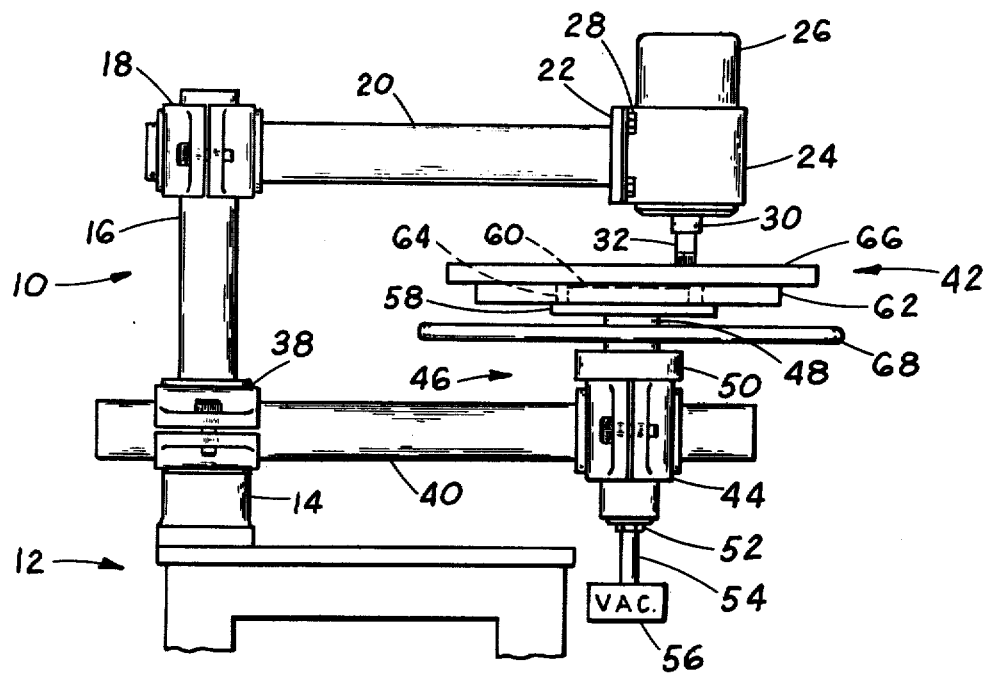
FIG. 1 is a side elevation of one embodiment of the cutting machine of the present invention.
Figure 2:
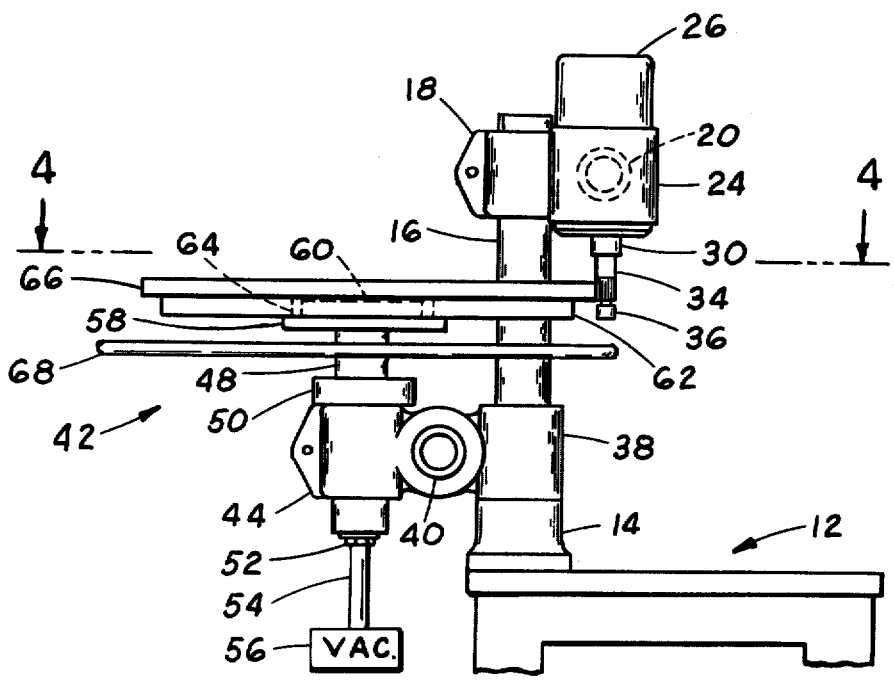
FIG. 2 is an end view of the machine shown in FIG. 1 as viewed from the right side of FIG. 1.
Figure 3:
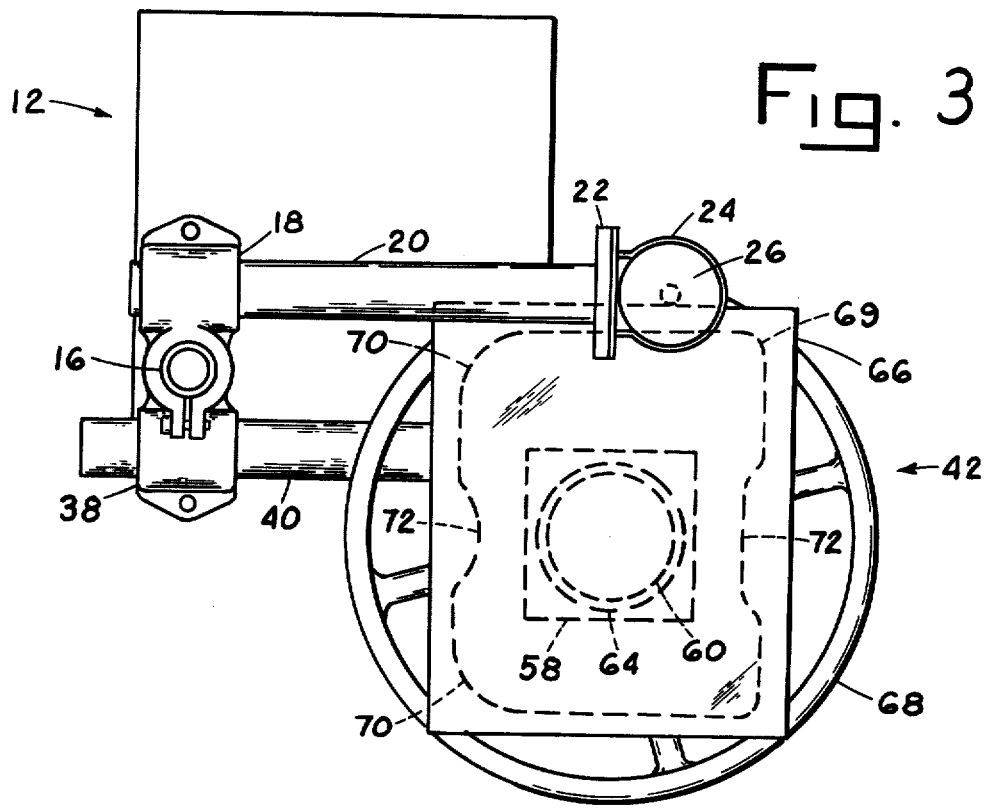
FIG. 3 is a plan view of the machine shown in FIG. 1.

Referring now to the drawings and particularly to FIGS. 1 through 3 thereof, there is shown one embodiment of the invention which is a presently preferred form of a manually operated machine. As seen in the drawings, the machine, generally designated by the numeral 10, is mounted on any suitable supporting base, such as the table generally designated by the numeral 12, of which only the upper part is shown. A single hole bracket 14 is suitably secured to the base 12 and supports an upstanding column 16 which extends to a convenient height above the table 12 as will be hereinafter apparent. A double hole bracket 18 is suitably secured to the upstanding column 16 at or near the upper end of the latter, the bracket 18 being of such construction as to support a horizontal bar 20 which extends from the column 16 toward the right as viewed in FIG. 1 for a predetermined distance which will be hereinafter apparent. The column 16 and the bar 20 are formed of hollow cylindrical stock, and the brackets 14 and 18 are of the releasable split type to facilitate adjustments, although these are not features of the invention and the vertical and horizontal members 16 and 20 respectively may be of any desired construction and may be secured together in any desired manner.

A mounting plate 22 is suitably secured to the free end of the bar 20, and a strap 24 encircles an electric or air motor 26 and fixedly secures the motor to the mounting plate 22 as by the bolts 28. The motor 26 is fitted with a suitable spindle or chuck 30 which receives and holds a cutting tool 32 which has, as best seen in FIG. 2, a cutting portion 34 and an edge following portion 36, which may be either a roller received in a groove or merely a smooth cylindrical or spherical surface formed on the cutting tool 32, the purpose of which will become clear as the description proceeds. Alternatively, the function of the edge follower portion 36 could also be filled by a roller mounted on the base 12 in vertical axial alignment with the cutting tool 32.

As thus far described, it will be seen that there is a cutting tool holding device with means to support the holding device is a predetermined fixed position and means to drive the holding device and a cutting tool held therein while the holding device is in the predetermined position. It will be understood that although the relative positions of the vertical column 16, the horizontal bar 20 and the motor 26 may be varied by suitable adjustments in the double hole bracket 18, once the parts are oriented as desired, the parts are fixed and the motor 26 remains in a predetermined fixed position relative to the rest of the machine yet to be described.

Referring back to FIG. 1, a work holder and work holder supporting means are shown in which another double hole bracket 38 is mounted as the column 16 just over the single hole bracket 14, the bracket 38 being rotatably mounted on the column 16 and resting on the bracket 14. The bracket 38 also supports a horizontal bar 40 which extends from the column 16 in the same direction as the bar 20. As best seen in FIG. 3, the bar 40 is not directly underneath the bar 20, but is laterally offset relative to the bar 20 toward the viewer as seen in FIG. 1. The bar 40 extends toward the right as seen in FIG. 1 to a point beyond the right hand end of the bar 20 so that a work holder, generally designated by the numeral 42, can be mounted on the bar 40 in juxtaposition with the motor 26 and the tool 32 as hereinafter fully explained.

A bracket 44 is mounted on the bar 40 adjacent the right hand end of the bar 40 and the work holder 42 is mounted in the bracket 44. The work holder 42 comprises a rotary vacuum device generally designated by the numeral 46, the specific details of which form no part of the present invention and therefore need not be described in detail. Since a variety of these devices are commercially available, it is deemed sufficient for a complete understanding of the machine herein described to observe that the rotary vacuum device has an elongate vertically arranged spindle 48 which is rotatably received within the bracket 44, and a suitable collar 50 is fixedly mounted on the spindle for rotation therewith, the collar 50 being adapted to slide on the upper surface of the bracket 44 thereby maintaining the spindle 48 in the position shown. The lower end of the spindle 48 is provided with a rotary vacuum joint 52 which is rotatably connected to the spindle 48, the joint 52 serving to connect a hose 54 to the spindle in such a manner that the spindle 48 can rotate relative to the hose 54 which remains stationary. The other end of the hose 54 is connected to any suitable vacuum pump 56 or other source of suction.

A flat plate 58 is suitably fixedly connected to the upper end of the spindle 48, and a suitable suction disc 60 (shown in dotted lines in the figures) is suitably fixedly connected to the plate 58 so that the plate 58 and the suction disc 60 both rotate with the spindle 48. A guide means for determining the edge configuration of the finished piece is provided in the work holder 42 and preferably comprises a template 62 (hereinafter more fully explained) which is suitably removably connected to the plate 58, the template being provided with an aperture 64 (shown in dotted lines in the figures) into which the suction disc 60 is received when the template is secured to the plate 58. The thickness of the suction disc 60 is dimensionally related to the thickness of the template 62 such that the upper surface of the suction disc 60 is at least contiguous, or slightly above, the upper surface of the template 62 when the parts are assembled and secured together as hereinabove described. The reason for this is that the upper surface of the suction disc must be accessible to the under surface of a sheet of material 66 which is to be cut when the latter is placed on the template 62. When the sheet 66 is so placed and suction is applied to the suction disc 60, it will be apparent that the sheet 66 will be firmly held to the upper surface of the template 62 for rotation therewith when the spindle 48 is rotated. It will be observed from the figures that a relatively large diameter hand wheel 68 may be suitably secured to the spindle 48 for conveniently rotating the spindle and the parts connected thereto. Alternatively, the hand wheel may be arranged so that the collar 50 forms the hub of the hand wheel. Also, any suitable means may be provided for communicating the suction from the joint 52 through the spindle 48, the plate 58 to the suction disc 60.

Figure 4:
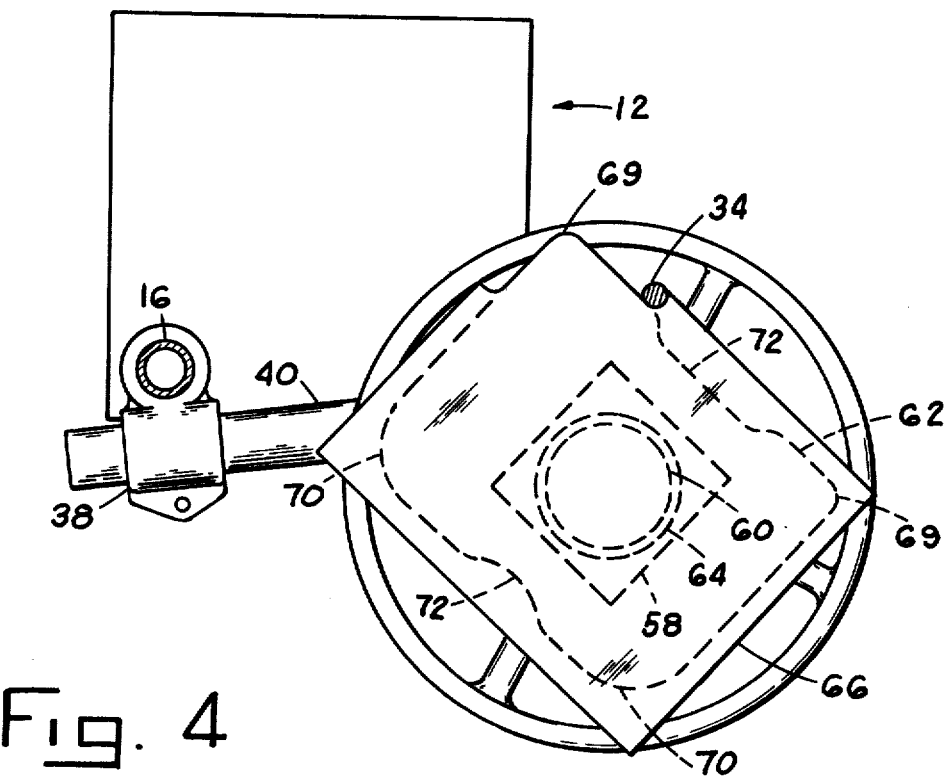
FIG. 4 is a fragmentary plan view, taken on the line 4—4 of FIG. 2, of the machine shown in FIG. 1, showing an advanced position of the work from the position shown in FIG. 3 during a cutting operation.

The template 62, as best seen in FIGS. 3 and 4 in dotted lines, is a member preferably made of relatively thick plywood and is pre-cut to have any desired edge contour and which serves, when connected to the machine 10, as a pattern defining the shape of the finished piece to be cut from the sheet of material 66. In the form of template 62 shown in FIG. 3, the template is generally rectangular with two small radius corners 69, two large radius corners 70 and two differently shaped depressions 72 formed in opposite edges of the template 62. It should be understood, however, that this configuration is solely for the purpose of illustration and any other desired configuration may be pre-cut into the template 62. As an alternative to the suction disc 60, the template 62 can be provided with a strip of flexible material on the upper surface thereof which forms a seal against the underside of the sheet material 66 when suction is applied to that portion of the template within the confines of the flexible strip with the result that the template itself is its own suction disc.

The operation of the machine shown in FIGS. 1–4 is as follows: After an appropriately shaped template 62 has been pre-cut or has been selected from standard templates maintained in stock, the template 62 is placed over the suction disc 60 and is secured to the plate 58, such as by being bolted thereto. Thereafter, a sheet of material 66, which is dimensionally larger than the template 62, is placed over the template so as to cover the entire upper surface thereof, and the vacuum source 56 is energized to apply a powerful suction to the suction disc 60 to thereby tightly grip the sheet 66 to the template 62. The motor 26 is then energized to cause the chuck 30 and the cutting tool 32 to rotate. All of the foregoing has, of course, been accomplished with the work holder 42 swung away from the cutting tool 32.

As best seen in FIGS. 3 and 4, when it is desired to start cutting, the operator grasps the hand wheel 68 and urges the entire work holder 42 and bar 40 assembly in a counter-clockwise direction as viewed in FIGS. 3 and 4 about the column 16 as an axis of rotation so as to bring the edge of the sheet 66 most adjacent to the cutting tool 32 into contact with the tool as seen in FIG. 3. As the work holder 42 is further so moved, the cutting portion 34 of the tool 32 begins to cut into the material 66 by gouging a groove therein having a width equal to the diameter of the cutting portion of the tool. This continues until the following portion 36 contacts the side edge of the template thereby arresting further counter-clockwise movement of the work holder about the column 16. At this point, the operator commences counter-clockwise rotation of the hand wheel 68 about the axis of the spindle 48 as an axis of rotation while simultaneously and continuously urging the hand wheel and work holder assembly in the aforesaid counter-clockwise direction about the column 16 so as to maintain contact between the edge of the template 62 and the follower portion 36 of the cutting tool 32. As the hand wheel is so rotated about the axis of the spindle, the spindle 48, plate 58, suction disc 60, template 62 and material 66 are all rotated therewith with the result that the sheet material 66 is cut along a line which conforms precisely with the edge configuration of the template 62. As seen in FIG. 4, the hand wheel and connected parts have been rotated approximately 45° from the starting position shown in FIG. 3 with the result that a portion of two adjacent side edges of the material 66 and one of the small radius corners 69 have been cut, and it is apparent that the depression 72 adjacent the tool 32 is about to be cut upon further counter-clockwise rotation of the hand wheel. It should also be apparent that one complete 360° rotation of the hand wheel, together with oscillation of the work holder 42 providing a compound motion of the work holder further explained below, will result in the sheet 66 being cut to form a unitary piece having precisely the same edge configuration as that of the template 62.

When the sheet is so cut, the work holder 42 is moved away from the cutting tool by clockwise rotation of the work holder about the column 16, the vacuum source is turned off and the cut piece is removed from the template 62. The machine is now ready to receive another sheet 66 and the foregoing operation is repeated as often as desired, each operation yielding another cut piece identical in shape with all of the others.

It should be apparent that the compound motion of the work holder 42 (and therefore of the sheet 66) mentioned above results from simultaneous rotation of the work holder 42 about the column 16 as the follower portion 36 of the cutting tool 32 follows the edge of the template 62. Thus, as the work holder 42 rotates, if the edge of the template 62 presents a line (whether straight or curved) which, at any given point of contact between the edge and the follower portion 36 of the cutting extends 32, extens generally toward the cutting tool 32, the work holder will be moved proportionately away from the cutting tool 32, that is, in a clockwise direction about the column 16. Conversely, if the edge of the template 62 presents a line at the aforesaid point of contact which extends generally away from the cutting tool 32, the work holder will be moved proportionately toward the cutting tool 32. It is, of course, incumbent upon the operator to permit movement of the work holder away from the cutting tool and to cause movement of the work holder toward the cutting tool as the follower portion of the cutting tool rides along the edge of the template in response to rotation of the hand wheel. The only circumstance under which a cutting operation can take place without the above described compound motion is if the line being cut is a segment of a circle the center of which is the axis of rotation of the work holder.

The machine hereinabove described and shown in FIGS. 1–4 is intended and designed primarily for cutting relatively small pieces, by which is meant pieces ranging from about 1 foot to about 3 to 4 feet along the longest dimension. As noted hereinabove, the arm 20 is adjustable in the bracket 18 and the arm 40 is adjustable in the bracket 38 so that these arms can be moved toward the left or the right to accommodate different sizes of templates; also the arms can be made of different lengths for this purpose. However, there is a practical limit as to the length of arm on the free end of which the motor 26 and the work holder 42 can be mounted in cantelever fashion before the whole assembly becomes unstable and therefore inaccurate. Accordingly, to accomplish the cutting of larger pieces ranging in the order of 4 feet and more along the longest dimension, an alternative form of the invention is shown in FIGS. 5–10 which has the capability of cutting pieces of irregular edge configuration and which has no upper limit as to the size of piece which can be cut. This machine can be adjusted to accommodate any size piece of sheet material which can be handled in a practical manner.

In this embodiment of the invention, the machine, generally designated by the numeral 100, comprises an elongate support on table 102 which independently supports a work tool component 104 and a work holder component 106. The work tool component 104 comprises a pair of brackets 108 suitably secured to the support 102, the brackets 108 holding a pair of spaced parallel columns 110. Each column has mounted thereon a bracket 112, both of which support a horizontal arm 114, to the free end of which is secured a plate 116 for mounting a strap 118 which encircles and fixedly secures a motor 120 to the free end of the arm 114. Although one column 110 might just as well suffice, two are provided for rigidity of the motor 120 since this is a heavy duty machine as will hereinafter appear and the lateral forces acting on the columns 110 are rather substantial. The motor 120 is provided with the usual chuck 122 for removably holding a cutting tool 124 in the same manner as in the previously described embodiment of the invention, and the general arrangement of the parts as thus far described in the same as that disclosed for the previous embodiment.

The work holder component 106 of this embodiment is considerably different in construction and operation from that of the previous embodiment in that, firstly, it is automatically controlled for both linear and rotary movement rather than being manually controlled, and, second, it is constructed to accommodate vastly larger sized pieces of sheet material than could be handled by the previous embodiment. It is, however, substantially the same in principle of operation and accomplishes the same function. Thus, the work holder component 106 is also mounted on the support 102 which, it should be noted, can be made as long as is desired to accommodate the size pieces being cut. The work holder component 106 comprises a pair of rails or bars 126 which are located adjacent a portion of the long side edges of the support 102, the rails being secured to the support 102 by suitable brackets 128. A transversely oriented support member 130 is connected to the rails 126 by means of suitable bearings 132 secured to the support member 130 and adapted to ride on the rails 126. The support member 130 is thus mounted for reciprocatory movement toward and away from the cutting tool 124, and is controlled for such movement by means to be fully described hereinafter.

Figure 6:
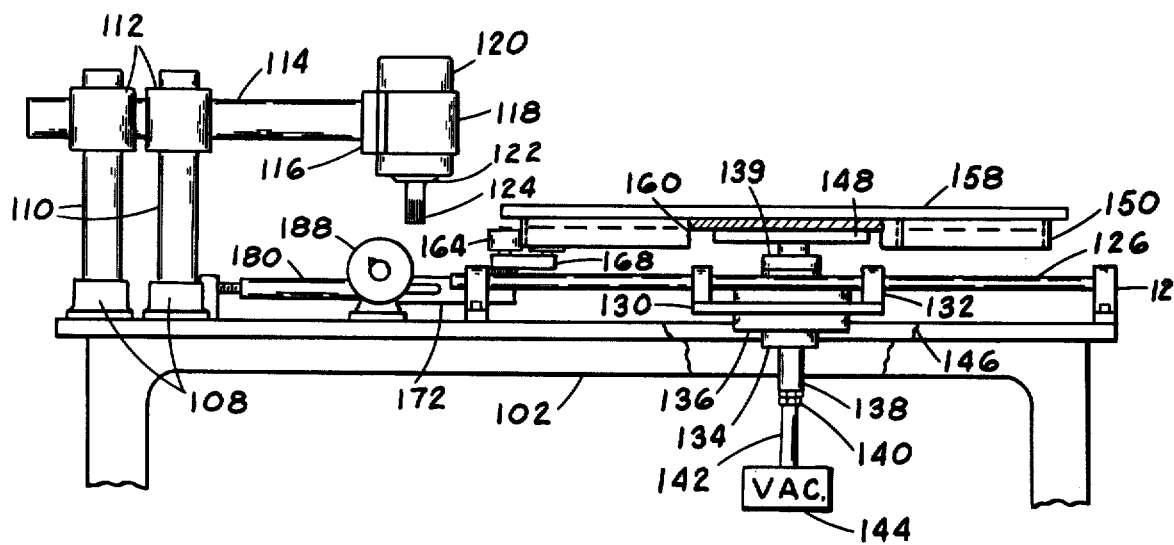
FIG. 6 is a front elevation of the machine shown in FIG. 5.

As best seen in FIGS. 6 and 8, the support member 130 is provided with a central aperture 132 around which is fixedly mounted a pillow block for rotatably supporting a vacuum spindle. The pillow block comprises a bearing member 134 having a surrounding flange 136 for securing the bearing member to the support member 130, and one such bearing member is secured to each side of the support member 130 in axially aligned relationship with the aperture 132. A vacuum spindle 138 extends through the bearing members 134 and is rotatable therein, and any suitable means is provided to prevent the spindle 138 from falling below a predetermined level, such as a bearing collar 139 on the spindle, or a set screw in the bearing member 134 riding in grooves on the spindle. The spindle 138 may be of the same type and construction as the spindle 48 used with the earlier described hand operated machine, being provided with a rotary air fitting 140 at the lower end thereof to receive the end of an air hose 142 connected to any suitable source of vacuum 144. It should be noted that the support 102 is provided with an elongate slot 146 (see FIGS. 6 and 7) through which the spindle 138 extends as the support member 130 reciprocates along the rails 126 as hereinafter described.

In a manner similar to the earlier described machine, except that the parts are of larger proportion to accommodate greater weight, a plate 148 is suitably fixedly secured to the upper end of the spindle 138 for rotation therewith, this plate being for the purpose of supporting a template 50 which is removably secured to the plate 148 as by being bolted thereto. The template 150, which serves the same purpose as the template in the manually operated version of the machine, is provided with a centrally located aperture 152 in which is located a suction disc 154 mounted on the upper surface of the plate 148 in any convenient manner, as by the lower disc flange 156 being compressed between the plate 148 and the template 150. The suction disc 154 securely grips the undersurface of the piece of sheet material 158 which is to be cut and holds the sheet material in firm engagement with the upper surface of the template 150. Thus, by the structure thus far described, the entire assembly consisting of the cross member 130 and everything mounted thereon can reciprocate lengthwise of the table 102, and the assembly of the pillow block, the spindle 138, the plate 148, the template 150, the suction disc 154 and the sheet material 158 can rotate on the cross member 130.

In distinction to the earlier described embodiment, in which the work holder was manually shifted and rotated in order to effect a cutting operation in accordance with the shape of the template, the work holder component of this embodiment is power driven, both with respect to the lateral shifting or reciprocating motion and the rotary motion of the work holder component. This is accomplished through a novel cooperation between a driving mechanism and the above described template so that a uniform velocity of the sheet material along the line of cut is obtained, thereby achieving the maximum velocity of cutting without any chatter or other undesirable cutting characteristics.

Referring again to FIGS. 5–10, it will be seen that the template 150 is provided around its periphery with a depending flange 160, best seen in FIG. 10, which is engaged on opposite surfaces by a pair of rollers. The interior roller 162 is merely a back up or pressure roller, while the exterior roller 164 is a driving roller for the template 150 which is driven in a manner described below and which in turn drives the template 150 by means of frictional engagement with the exterior surface of the template flange 160, as clearly seen in FIGS. 7 and 10.

Means are provided to drive the roller 164 and to maintain the rollers 164 and 162 in contact with the surfaces of the flange 160 regardless of the angle of the latter relative to the rollers 164 and 162 as the template 150 rotates. Thus, the pressure roller 162 is rotatably mounted on a stub shaft 166 carried by an oscillating block 168. The drive roller 164 is fixedly secured to a shaft 170 which passes through the block 168 and is rotatably received in the end of a bar 172. A gear 174 is fixedly mounted on the shaft 170 for rotation therewith when the gear 174 is driven as hereinafter described. The parts are so arranged, with suitable bearings to facilitate rotation, such that the block 168 can oscillate on the shaft 170 while the latter rotates to turn the drive roller 164. This feature of the block 168 being rotatably mounted on the shaft 170 also permits the rollers 164 and 162 to be utilized to move the template and sheet assembly linearly from a loading position to a cutting position and back, these positions being shown in FIGS. 5 and 7 respectively, and in solid and dotted line positions respectively in FIG. 9.

This is accomplished by means of a drive mechanism for oscillating the bar 172 to move the rollers 162 and 164 between the above mentioned positions. Thus, the bar 172 is pivotally connected to the table as by the pivot pin 175. A rod 176 is pivotally connected as at 178 to the bar 172, the other end of the rod 176 being connected to a piston (not shown) which is reciprocably mounted within a cylinder 180 (FIGS. 5 and 7) connected to a bracket 181. By introducing air under pressure through the fittings 182 or 184 alternatively, the bar 172 can be moved between the positions shown respectively in FIGS. 5 and 7, or between the solid line and dotted line positions respectively shown in FIG. 9. It will also be apparent by comparing these positions in FIG. 9 that the angular relation between the block 168 and the bar 170 changes during the above described movement of the bar 170 and its associated parts and the template 150.

The drive roller 164 for the template 150 is driven by the gear 174 meshing with a worm 186 when the bar 172 is moved by the air cylinder 180 to the extreme left hand position shown in FIGS. 7 and 9, the worm gear 186 being driven by a variable speed electric motor 188 suitably mounted on the table 102. It will be apparent that the driving engagement of the gear 174 with the worm 186 is effected solely by movement of the bar 172 by the air cylinder. The location of the motor 188 on the table 102 is such that when the gear 174 is engaged with the worm, the cutting tool 124 is disposed adjacent the edge or flange 160 of the template so that when the roller 164 moves the template, the cutter 124 cuts the sheet 158 along the edge of the template 150. The respective positions of the bar 172 and therefore the template 150 may also be controlled by suitable stop means provided within the air cylinder 180 or mounted on the table 102 and cooperating with the bar 172.

A complete cycle of operation of the above described apparatus will now be set forth with reference to the template shown in FIGS. 5 and 7 which is designed to cause the cutting of a sheet of plastic material in the shape of a carpet cover or mat intended for use under an office chair and having a large relatively rectangular portion for supporting the chair and a small tongue portion which extends under a desk. The cover facilitates the rolling of a caster chair on the carpet and prevents excessive wear on the carpet.

Figure 5:
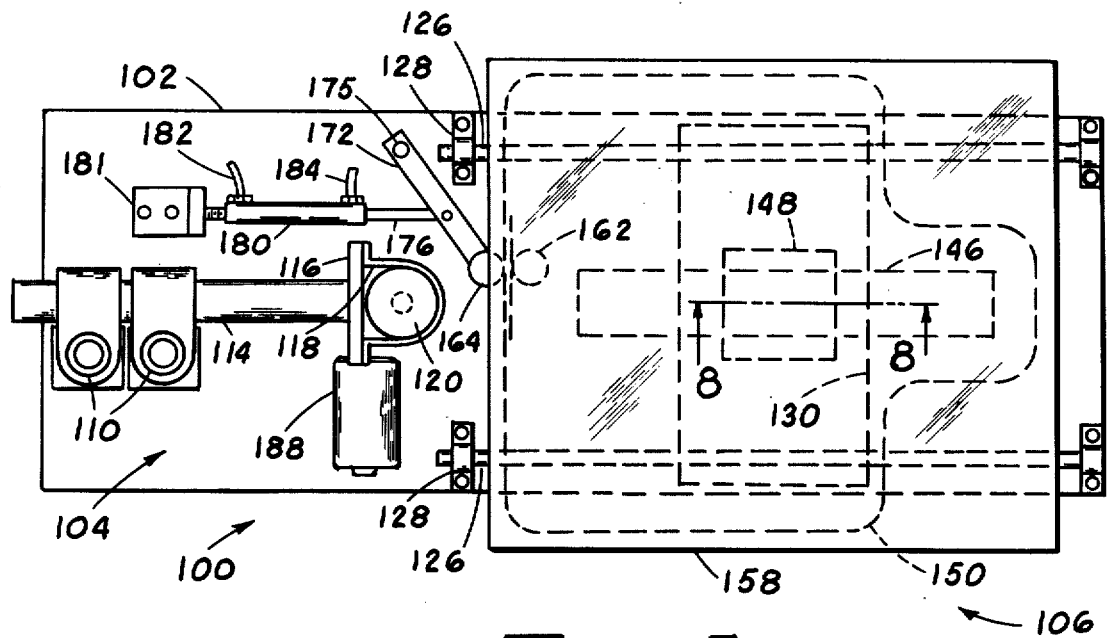
FIG. 5 is a plan view of another embodiment of the cutting machine of the present invention which is of larger and heavier construction than the machine of the previous embodiment and includes automated means for moving the sheet material in conjunction with a cutting operation.

With the work holder component in the position shown in FIG. 5, a sheet of material to be cut which is dimensionally larger than the template 150 is placed over the template and suction is then applied to the vacuum disc from the suction source 144, thereby securing the sheet 158 to the top surface of the template 150. The motors 120 and 188 are energized to drive the cutting tool 124 and the worm 186 respectively. Air under pressure is then admitted into the cylinder 180 through the fitting 184 to urge the piston therein and the rod 176 toward the left as viewed in the figures, thereby pivoting the bar 172 clockwise about the pivot point 175 so as to move the rollers 162 and 164 from the loading position shown in FIG. 5 to the cutting position shown in FIG. 7. When the edge of the sheet material 158 contacts the cutting tool 124, the latter cuts a groove into the sheet material as the latter is moved further toward the cutting tool by the bar 172 and the rollers 162 and 164.

When the gear 174 comes into engagement with the worm 186 which is already turning, the gear 174 drives the shaft 170 and the roller 164 which in turn moves the flange 160 of the template 150 by frictional engagement with the flange 160 and in cooperation with the back-up or pressure roller 162. The template 150 is thus caused to rotate with the spindle 138 about the axis of the spindle. Looking at FIG. 7, if it is assumed that the direction of rotation of the template is clockwise, it will be apparent that two things happen. Firstly, the side of the template flange 160 engaged by the rollers 162 and 164 gradually assumes an angle relative to the position shown in the figures, and the block 168 supporting the roller 162 also assumes an angle to the position shown so that the axis of the block 168 is always perpendicular to the flange 160 at the point of contact therewith of the rollers 162 and 164 so that the latter are always in proper driving engagement with the flange 160. Secondly, as the template rotates the entire assembly of the template 150 through the support member 130 will be pushed toward the right as viewed in FIG. 7, that is, away from the cutting component 104 of the machine, the support member 130 sliding on the rails 126. The reason for this is the radius from the axis of rotation of the template 150 to the outer edge thereof engaged by the rollers 162 and 164 gradually increases from the center of the straight portion of the template toward the lower corner thereof. After the lower corner passes the rollers 162 and 164, the entire template and support assembly moves toward the left or toward the cutting component 104 upon continued rotation of the template, and during this movement, the cutting tool 124 is cutting the sheet material 158 along the outer edge of the template. It will be apparent that when the template has been driven through one complete turn, a finished piece will have been cut which conforms precisely to the overall contour of the template. At that point, air is introduced into the opposite end of the cylinder 180 through the inlet fitting 182 to drive the piston, the rod 176 and the bar 172 toward the right, thereby disengaging the gear 174 from the worm 186 to stop the rotation of the template and to return the template to the loading position shown in FIG. 5. The suction to the template is then turned off and the finished piece is removed from the template, at which time the machine is ready for another cycle of operation.

I claim:
1. A machine for cutting irregular shapes in relatively flat sheet material comprising:
   A. a cutting tool holding device adapted to removably hold a cutting tool,
   B. means for supporting said cutting tool holding device in a fixed predetermined position,
   C. means for driving said cutting tool holding device while the latter is supported in said fixed predetermined position,
   D. a rotary work holder holder for supporting a piece of sheet material to be cut, said work holder including
      1. a vertically oriented body member,
      2. a template carried by the upper end of said body member and having a flat upper surface lying in a plane for supporting the piece of sheet material to be cut and having an outer edge which defines a predetermined configuration to which the piece of sheet material is to be cut, and
      3. vacuum means disposed adjacent said upper end of said body member and being adjacent to and lying parallel to said plane and operable through said template on the undersurface of a piece of sheet material supported by said template for releasably securing the piece of sheet material to said upper surface of said template,
   E. means for supporting said work holder at a lower elevation than said cutting tool holding device such that said template with a piece of sheet material secured thereon is in operative association with a cutting tool held by said holding device, said supporting means including means for movably supporting said work holder for simultaneous rotation about a central axis of said work holder and for translation relative to said cutting tool holding device in a direction perpendicular to said axis of rotation of said work holder, and
   F. means disposed adjacent said cutting tool holding device and operatively associated with said outer edge of said template for determining the extent and direction of translational movement of said template in accordance with the configuration of said outer edge of said template,
whereby, by a combination of rotary and translational movement of said work holder, said template is moved along the cutting tool and the sheet material is cut along a contour as determined by said outer edge of said template.

2. A machine as set forth in claim 1 wherein said vacuum means comprises a suction disc positioned within an aperture formed in said template with the upper surface of said suction disc being contiguous with the upper surface of said template, and conduit means including a rotary joint for connecting said suction disc with a source of vacuum while said work holder is rotating.

3. A machine as set forth in claim 2 wherein said body member is a spindle freely rotatably mounted on said work holder supporting means, and wherein said conduit means is disposed partly within said rotary spindle and said rotary joint is mounted on the lower end of said spindle, said conduit means communicating between said suction disc and an external source of suction whereby suction is applied to said suction disc while said disc and said template are rotating.

4. A machine as set forth in claim 1 wherein said means for supporting said cutting tool holding device comprises a vertical column and a horizontal arm fixedly connected to said vertical column, said cutting tool holding device and said driving means therefor being mounted on said horizontal arm adjacent the free end thereof, and wherein said work holder supporting means comprises a first supporting means mounted for linear reciprocatory movement toward and away from said cutting tool holding device and a second supporting means mounted on said first supporting means for rotary movement about the central axis of said second supporting means, said second supporting means supporting said work holder.

5. A machine as set forth in claim 4 further including drive means engaged with said work holder for rotating said work holder on said second supporting means and moving said first and second supporting means linearly toward and away from said cutting tool holding device from a work loading position to a work cutting position and back respectively at the commencement and termination of a cutting cycle of said machine.

6. A machine as set forth in claim 5 wherein said guide means of said work holder comprises a template secured to said second supporting means and having a flat upper surface for supporting the piece of sheet material, the template having an outer edge which defines a predetermined irregular configuration to which the piece of sheet material is to be cut and further having a depending flange surrounding said outer edge, and wherein said drive means includes a first driving device engageable with said flange for moving said flange past said first driving device to thereby rotate said template and a second driving device connected to said first driving device for moving the latter toward and away from said cutting tool holding device to thereby move said template linearly toward and away from said cutting tool holding device.

7. A machine as set forth in claim 6 wherein said first driving device comprises a pair of rollers disposed on opposite sides of said flange in tight frictional engagement therewith, said rollers being mounted on a block which is pivotally mounted on a bar movable between two limit positions corresponding to said loading and cutting positions of said work holder, and means for driving one of said rollers when said bar is in said limit position corresponding to said cutting position of said work holder.

8. A machine as set forth in claim 7 wherein said last named means comprises a driven gear coaxially mounted with one of said rollers and engageable with a fixed driving gear when said bar is in said limit position corresponding to said cutting position of said work holder.

9. A machine as set forth in claim 8 wherein said second driving device comprises means for moving said bar between said limit positions to thereby move said template between said cutting and loading positions and to cause engagement and disengagement of said driven gear with said driving gear respectively to stop rotation of said template when said template is not in said cutting position.

10. A machine for cutting irregular shapes in relatively flat sheet material comprising:
   A. a cutting tool holding device adapted to removably hold a cutting tool,
   B. means for supporting said cutting tool holding device in a fixed predetermined position, said means comprising a vertical column and a first horizontal arm adjustably fixedly connected to said vertical column,
   C. means for driving said cutting tool holding device while the latter is supported in said fixed predetermined position, said cutting tool holding device and said driving means therefor being mounted on said first horizontal arm in spaced relation with said vertical column,
   D. a rotary work holder for supporting a piece of sheet material to be cut, said work holder comprising
      1. a vertically oriented body member,
      2. a template carried by the upper end of said body member and having a flat upper surface for supporting the piece of sheet material to be cut and having an outer edge which defines a predetermined configuration to which the piece of sheet material is to be cut, and
      3. vacuum means disposed adjacent said upper end of said body member and operable through said template on the undersurface of a piece of sheet material supported by said template for releasably securing the piece of sheet material to said upper surface of said template,
   E. means for supporting said work holder at a lower elevation than said cutting tool holding device such that said template with a piece of sheet material secured thereon is in operative association with a cutting tool held by said holding device, said supporting means comprising means for movably supporting said work holder for simultaneous rotation about a central axis of said work holder and for translation relative to said cutting tool holding device in a direction perpendicular to said axis of rotation of said work holder, said last named means comprising
      1. a second horizontal arm pivotally connected to said vertical column beneath said first horizontal arm for pivotal movement in a horizontal plane about said vertical column as an axis of rotation, and
      2. means adjustably carried by said second horizontal supporting arm in spaced relation with said vertical column for supporting said work holder for rotation about said central vertical axis of said work holder, said work holder being located on said second horizontal arm such that said template is in juxtaposition with a cutting tool held by said holding device as aforesaid and with said means disposed adjacent said cutting tool holding device, and
   F. means disposed adjacent said cutting tool holding device and operatively associated with said outer edge of said template for determining the extent and direction of translational movement of said template in accordance with the configuration of said outer edge of said template, whereby, by a combination of rotary and translational movement of said work holder, said template is moved along the cutting tool and the sheet material is cut along a contour as determined by said outer edge of said template.

11. A machine as set forth in claim 10 wherein said vertically oriented body member comprises a rotary spindle mounted on said means carried by said second horizontal arm in the location aforesaid for rotation about the central vertical axis of said spindle, said spindle having means for connecting said template and said vacuum means to the upper end of said spindle.

12. A machine as set forth in claim 11 further including handle means connected to said spindle for manually moving said second horizontal arm in a back and forth pivotal movement about said vertical column and for independently rotating said spindle about its axis.

13. A machine as set forth in claim 4 wherein said first support means comprises a pair of rails mounted on said machine and extending longitudinally toward and away from said cutting tool holding device, and an elongate member extending transversely across said rails and including means providing for movement of said elongate member on said rails, and wherein said second supporting means comprises a rotary spindle mounted on said elongate member for rotation about the central vertical axis of said spindle, said spindle having means for connecting said guide means and said releasable securing means to the upper end of said spindle.

14. A machine for cutting irregular shapes in relatively flat sheet material comprising:
   A. a cutting tool holding device adapted to removably hold a cutting tool,
   B. means for supporting said cutting tool holding device in a fixed predetermined position,
   C. means for driving said cutting tool holding device while the latter is supported in said fixed predetermined position,
   D. a rotary work holder for supporting a piece of sheet material to be cut, said work holder including
      1. a vertically oriented body member,
      2. a template carried by the upper end of said body member and having a flat upper surface for supporting the piece of sheet material to be cut and having an outer edge which defines a predetermined configuration to which the piece of sheet material is to be cut, and
      3. vacuum means disposed adjacent said upper end of said body member and being adjacent to and lying parallel to said plane and operable through said template on the undersurface of a piece of sheet material supported by said template for releasably securing the piece of sheet material to said upper surface of said template,
   E. means for supporting said work holder at a lower elevation than said cutting tool holding device such that said template with a piece of sheet material secured thereon is in operative association with a cutting tool held by said holding device, said supporting means including means for movably supporting said work holder for simultaneous rotation about a central axis of said work holder and for translation relative to said cutting tool holding device in a direction perpendicular to said axis of rotation of said work holder, said last named means comprising 1. a first supporting means mounted for translational movement toward and away from said cutting tool holding device and a second supporting means mounted on said first supporting means for supporting said body member for rotation about the central vertical axis of said body member, said second supporting means constituting the sole supporting means for said work holder, and
2. wherein said first supporting means carrying said second supporting means and said work holder is mounted for pivotal movement about an axis spaced from said cutting tool holding device, and E. means disposed adjacent said cutting tool holding device and operatively associated with said outer edge of said template for determining the extent and direction of translational movement of said template in accordance with the configuration of said outer edge of said template, whereby, by a combination of rotary and translational movement of said work holder, said template is moved along the cutting tool and the sheet material is cut along a contour as determined by said outer edge of said template.

* * * * *